April 27, 1948.　　　　F. D. SMITH　　　　2,440,452

QUICK ACTION COUPLING

Filed March 2, 1944

INVENTOR.
FRED D. SMITH
BY　E. Woodbury
ATTY.

Patented Apr. 27, 1948

2,440,452

UNITED STATES PATENT OFFICE 2,440,452

QUICK ACTION COUPLING

Fred D. Smith, Long Beach, Calif., assignor to Oilfields Service Co., Long Beach, Calif., a corporation of California Application March 2, 1944, Serial No. 524,702

2 Claims. (Cl. 285—174)

This invention relates to couplings for pressure-fluid lines and particularly to couplings that can be quickly connected and disconnected.

An object of the invention is to provide a coupling that is simple and inexpensive, that can be quickly connected and disconnected, that is always fluid-tight when connected irrespective of any lack of skill or care in making the connection, that is capable of withstanding large tensile forces when connected, that can be connected and disconnected without relative rotation between the two parts, and that permits free swiveling of the parts in service.

A coupling in accordance with my invention, whereby the forgoing object is achieved, consists of a pair of loosely telescoping, tubular male and female members with a resilient doughnut-type ring mounted in an annular groove in one of the telescoping walls for effecting a seal between the members, and a split spring retaining ring or snap ring engageable between cooperating annular shoulders in the two members for holding the parts together. The members and the retaining ring may be specially shaped to facilitate rapid release and placing of the ring.

Although both doughnut-type seals and snap retaining rings have been used separately before in other fields, to the best of my knowledge they have never been used in a quick detachable coupling, and their combination in a coupling results in the many advantages heretofore pointed out as the object of the invention.

A full understanding of the invention may be had from the following detailed description of two embodiments thereof which are shown in the drawing.

Figure 1:
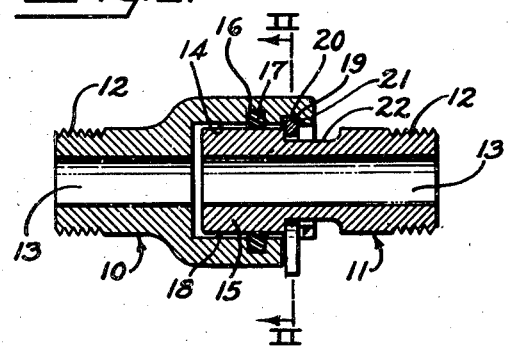
Fig. 1 is a longitudinal sectional view through one embodiment of the invention.
Figure 2:
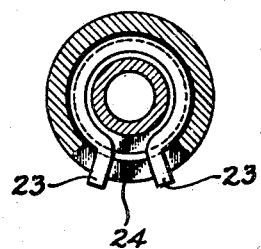
Fig. 2 is a cross section taken substantially in the plane II—II of Fig. 1.

Referring first to Figs. 1 and 2, the coupling therein disclosed comprises as its main elements a female member 10 and a male member 11 adapted to be releasably connected together in fluid-tight relation. Each of the members may be connected to a fixture or a conduit in any desired manner but, for convenience of disclosure, each member is shown as having external threads 12 on its outer end for connection to its associated fixture or conduit. Each member also has an internal passage 13, which passages are in alignment with each other when the members are coupled together.

The female member 10 is belled at its inner end to provide a counterbore 14 of relatively large diameter which, in the particular combination shown, is slightly larger than the external diameter of the male member 11, so that the counterbore is capable of freely receiving a head 15 which constitutes the inner end of the male member.

To effect a seal between the two members, there is provided in the internal cylindrical surface constituting the bore 14, an annular groove 16 of rectangular cross sectional shape in which there is mounted a resilient doughnut sealing ring 17. This ring 17 is normally of circular cross section, but has a diameter somewhat greater than the depth of the groove 16, so that it projects from the groove into contact with the external cylindrical surface 18 of the head 15.

When the structure described carries fluid under pressure, the fluid pressure in the clearance between the surfaces 14 and 18 enters the groove 16 and distorts the ring 17 in such a way as to urge it tightly against the opposite face of the groove and against the external cylindrical surface 18, so as to prevent any escape of fluid therepast.

The resilient ring 17 normally projects inwardly beyond the surface 14 a distance sufficient to engage the surface 18 on the male member and slightly resist connecting and disconnecting movement of the latter.

In order to retain the two members in the telescoping relation shown in Fig. 1, a snap ring 19 is provided. As shown, this ring is normally expanded to fit snugly in a second groove 20 in the internal cylindrical surface 14 of the female member, the ring being of sufficient radial thickness to project radially inwardly from the inner surface 14 a sufficient distance to engage a shoulder 21 at the outer end of the head 15. Thus, the shoulder 21 is formed at the juncture of the head 15 with a neck 22 which connects the head to the remainder of the male member 11.

When it is desired to separate the two members of the coupling, the snap ring 19 is contracted sufficiently to disengage it from the groove 20, and while it is so contracted the parts are pulled apart.

It will be noted that the diameter of the neck portion 22 of the male member is of sufficiently small diameter to permit contraction of the ring 19 clear of the groove 20.

The ring 19 may be of various forms, but as shown in Fig. 1, its ends are bent radially outwardly at right angles as indicated best in Fig. 2, the ends 23 projecting through an arcuate recess 24 in the female member so that they can be grasped between the fingers or between the jaws of a pair of pliers for contraction of the ring.

When the parts are detached, the snap ring 19 remains on the male member 11. When the parts are to be again connected, the male member is inserted into the female member while squeezing the ends 23 of the snap ring together to enable the ring to enter the bore 14 in the female member. When the ring has been moved into position opposite the annular groove 20, the ends 23 are released, permitting the ring to expand into the groove.

The clearance between the internal and external cylindrical surfaces 14 and 18 is not critical, but a maximum clearance of .010 inch has been found very satisfactory in practice, since it permits easy connection and disconnection of the parts while at the same time providing a fluid-tight connection capable of resisting very large tensile forces without becoming disconnected.

It will be noted that there is no obstruction to relative rotation between the two parts of the coupling, so that relatively free swiveling is permitted when there is no pressure in the passages 13. Of course, pressure expands the doughnut ring 17 into contact with the parts, thereby offering frictional resistance to relative rotation.

In the construction shown and described, the ends 23 of the snap ring preferably project radially beyond the wall of the female fitting to permit their being grasped with the fingers or with a pair of pliers.

Figure 3:
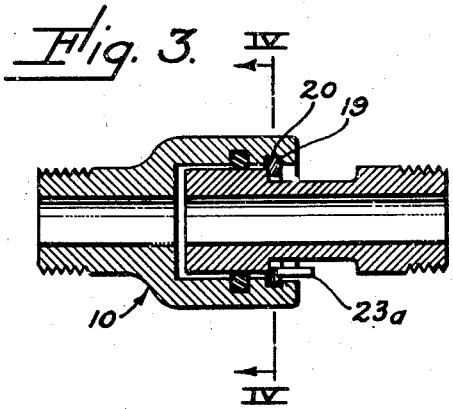
Fig. 3 is a longitudinal section similar to Fig. 1, but showing an alternative construction.
Figure 4:
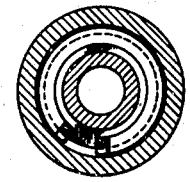
Fig. 4 is a cross section taken substantially in the plane IV—IV of Fig. 3.

However, such an arrangement may be objectionable in some fields of use and a more streamlined version of the invention is desirable under such conditions. Such a version is shown in Figs. 3 and 4 in which the construction is identical with that shown in Figs. 1 and 2, except for the omission from the female member 10 of the arcuate slot 24 and the projection of the arms 23a of the snap ring 19 axially instead of radially. With this arrangement, the arms 23a are of lesser radial thickness than the main portion of the snap ring so that the arms extend out of the open end of the female member without cutting away a portion of the latter, as in the modification of Figs. 1 and 2.

As has been previously noted in the modifications described, the retaining ring remains on the male member when the members are separated. However, this is not essential, and, if desired, the annular groove 20 in the female member may be made deeper so that the ring can be expanded into the groove sufficiently to clear the shoulder 21 on the male member and permit retraction of the latter. In such an arrangement the ring would be normally contracted snugly about the neck 22 of the male member when the members are coupled together, but would be of sufficient radial thickness or width to remain in the groove 20 in the female member when the parts are separated.

Although for the purpose of explaining the invention certain embodiments thereof have been described in detail, various minor changes can be made from the construction disclosed without departing from the invention which is to be limited only to the extent set forth in the appended claims.

I claim:

1. A coupling comprising in combination: a female tubular member having an internal surface extending inward from one end thereof; a male tubular member having a head with an external surface adapted to telescope freely within the internal surface, one of said surfaces having an annular groove therein, said male and female members having cooperating shoulders thereon; a resilient sealing ring in said annular groove and dimensioned to project beyond said groove and yieldably engage and seal with the member having the other of said surfaces; and a split retaining ring engageable between said shoulders for securing said two members in telescopic engagement with each other, the relative radial widths of said split ring and one of said shoulders being such as to permit radial distortion of the split ring sufficient to disengage the other of said shoulders, the ends of said split ring being bent substantially at right angles to the body of the split ring and extending substantially axially beyond the open end of said female member and within the limits of the greatest diameter of said female member.

2. A coupling of the type described, comprising: a female tubular member having an internal cylindrical surface extending from one end thereof; a male tubular member having a head with an external cylindrical surface shorter than but of diameter to freely telescope with said internal cylindrical surface, one of said cylindrical surfaces having an annular groove therein containing a resilient sealing ring dimensioned to project beyond said groove and yieldably engage and seal with the other said cylindrical surface, said male and female members having cooperating shoulders thereon; and a split spring retaining ring engageable between said shoulders for securing the two members in telescoping engagement with each other, the relative radial widths of said split ring and one of said shoulders being such as to permit radial distortion of the ring sufficient to carry it out of engagement with the other shoulder, said split ring having exposed ends bent at right angles and the end of said female member having an arcuate slot extending therethrough and through which slot said exposed ends extend substantially radially.

FRED D. SMITH.

REFERENCES CITED

The following references are of record in the file of this patent:

UNITED STATES PATENTS

| Number | Name | Date |
|--------|------|------|
| 235,580 | Smith et al. | Dec. 14, 1880 |
| 472,342 | Draudt | Apr. 5, 1892 |
| 738,503 | Waters | Sept. 8, 1903 |
| 1,309,830 | Wanamaker | July 15, 1919 |
| 1,698,087 | Field | Jan. 8, 1929 |
| 2,092,243 | Breese | Sept. 7, 1937 |
| 2,111,956 | Baldwin | Mar. 22, 1938 |